United States Patent
Deliens

[11] Patent Number: 5,908,570
[45] Date of Patent: Jun. 1, 1999

[54] ELECTRIC KETTLE WITH METAL HEATER PLATE

[75] Inventor: Patrick Deliens, Dampierre, France

[73] Assignee: Seb S.A., Ecully, France

[21] Appl. No.: 08/853,348

[22] Filed: May 8, 1997

[30] Foreign Application Priority Data

May 14, 1996 [FR] France ................................. 96 05987

[51] Int. Cl.[6] .............................. A47J 27/21; H05B 3/82; H05B 3/02
[52] U.S. Cl. .......................................... 219/439; 219/438
[58] Field of Search ..................................... 219/385–387, 219/429, 433, 435–439, 441, 442; 392/441, 444; 99/281, 323.3

[56] References Cited

FOREIGN PATENT DOCUMENTS

| 0285839 | 10/1988 | European Pat. Off. . |
|---|---|---|
| 0574310 | 12/1993 | European Pat. Off. . |
| 2708407 | 2/1995 | France . |
| 2443500 | 4/1976 | Germany . |
| 2066052 | 7/1981 | United Kingdom . |
| 2291324 | 1/1996 | United Kingdom . |
| 96/18331 | 6/1996 | WIPO . |

*Primary Examiner*—Teresa Walberg
*Assistant Examiner*—J. Pelham
*Attorney, Agent, or Firm*—Banner & Witcoff, Ltd.

[57] ABSTRACT

An electric kettle includes a plastics material tank side wall structure for liquid to be heated and a heating arrangement including an electrical element associated with a metal heater plate mounted at the bottom of the side wall structure with its top face in direct contact with the liquid to be heated. The side wall structure includes shoulders to support a peripheral rim of the metal heater plate. A seal is disposed between the side walls and the peripheral rim of the heater plate. The kettle has a base including a skirt which fits around the side walls of the tank. A fixing arrangement attaches the base to the tank side wall structure.

9 Claims, 2 Drawing Sheets

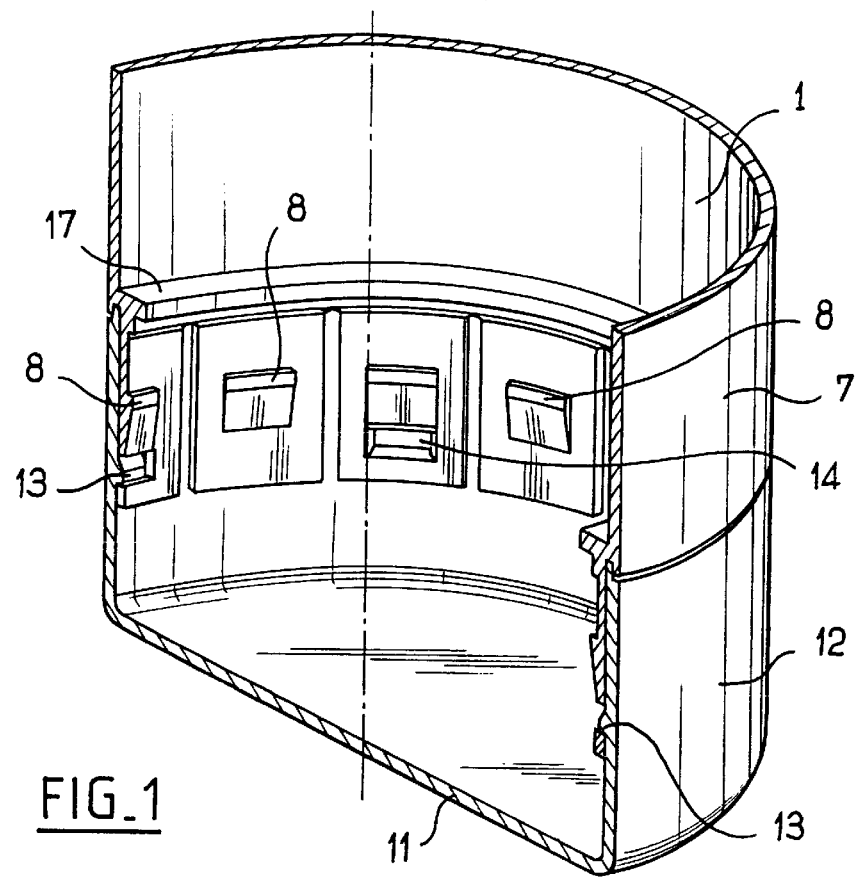
FIG_1
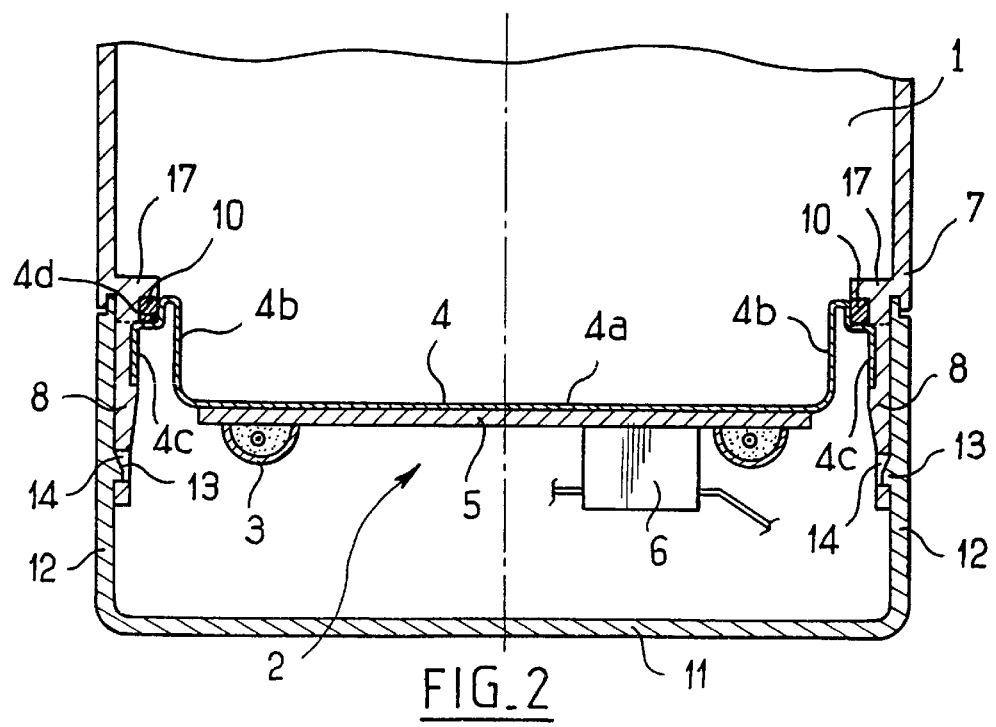
FIG_2

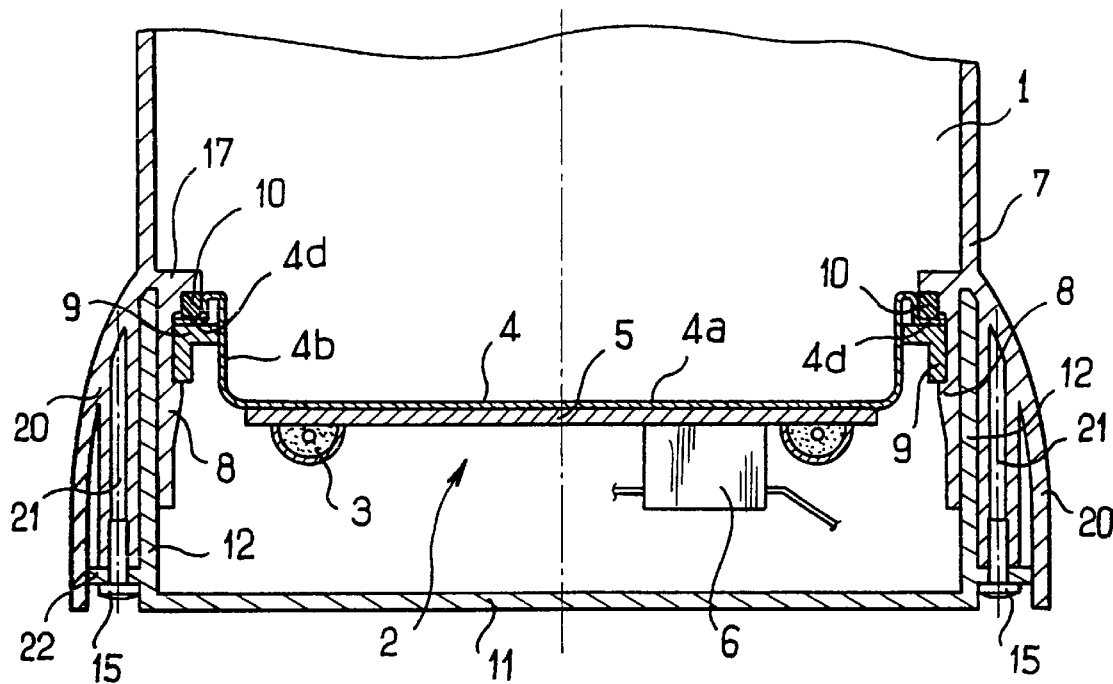
FIG_3
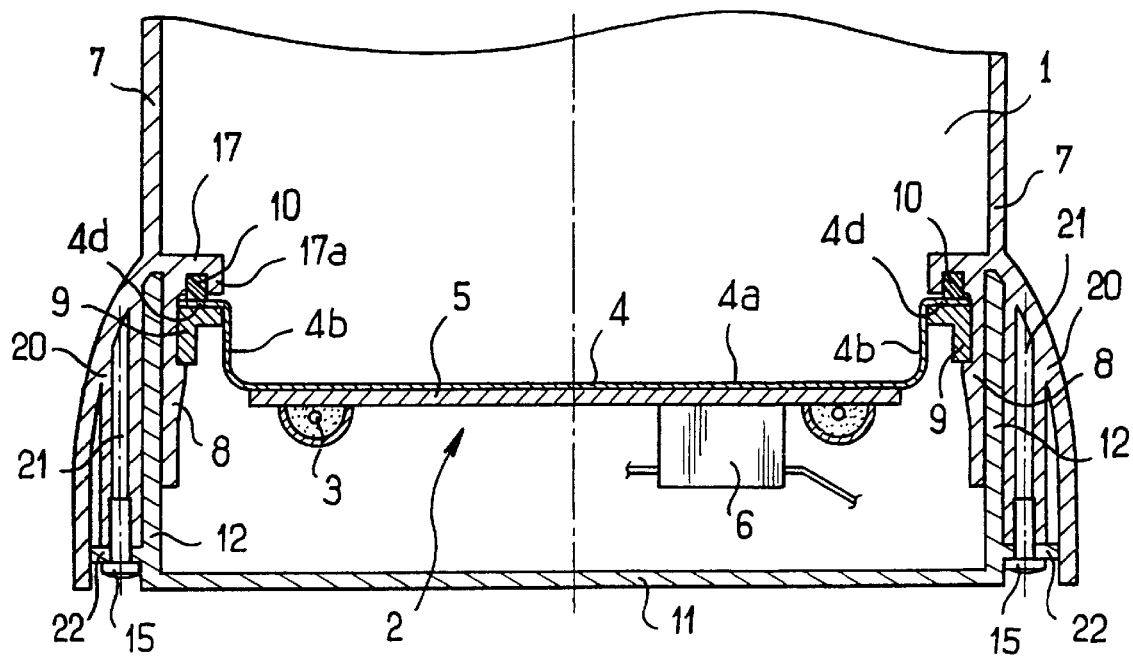
FIG_4

ELECTRIC KETTLE WITH METAL HEATER PLATE

BACKGROUND OF THE INVENTION

1. Field of the Invention

The present invention concerns an electric kettle with a metal heater plate.

2. Description of the Prior Art

Providing tanks of liquid to be heated with heating means including an electrical element associated with a metal heater plate which is mounted at the bottom of the tank and the top face of which comes into direct contact with the liquid to be heated is known in itself.

In conventional kettles, this heater plate is molded or crimped directly into the walls of the tank, near its bottom.

A plate fixed in this way is not removable, however, which makes working on the heater plate difficult in the event of repairs. Molding the plate into the tank is also a complicated procedure.

French patent application 93 09 467 in the name of the Applicant describes a kettle having a heater plate resting on a shoulder inside the tank, with a seal between them, a central screw extending between the bottom of the tank and the center of the heater plate in order to hold the edge of the latter in contact with the seal.

However, this arrangement has the drawback of taking up space under the heater plate, where the electrical element and the control and safety means for the heater plate have to be accommodated.

What is more, pressing the plate onto the seal by means of an axial screw necessitates a disk-shape plate and therefore a kettle with a cylindrical tank.

An aim of the present invention is to overcome the aforementioned disadvantages by proposing an improved system for fitting the heater plate into the body of a kettle tank.

SUMMARY OF THE INVENTION

The electric kettle of the invention includes a plastics material tank side wall structure for liquid to be heated and heating means including at least one electrical element associated with a metal heater plate mounted at the bottom of the tank side wall structure and with its top face in direct contact with the liquid to be heated. The side wall structure of the tank includes shoulder means adapted to support a peripheral rim of the metal heater plate, a seal being disposed between the side walls and the peripheral rim of the heater plate. The kettle has a base including a skirt adapted to fit around the side walls of the tank, and fixing means attaching the bottom to the tank.

Accordingly, the heater plate is held in place on the shoulder means by a counter-locking effect obtained by the skirt gripping the side walls of the tank. This prevents any tendency for these walls to move apart.

This arrangement using an external skirt makes all of the space between the base and the heater plate accessible.

What is more, this arrangement does not impose any tank shape constraints.

In an advantageous version of the invention, the skirt surrounds the side walls of the tank from the bottom of the tank side walls to a point beyond the shoulder means.

The skirt is therefore in contact with the side walls of the tank at the level of the shoulder means and has a counter-locking action directly at the location of the heater plate fixing area.

Other features and advantages of the invention will emerge from the following description.

BRIEF DESCRIPTION OF THE DRAWINGS

In the accompanying drawings, which are provided by way of non-limiting example:

FIG. 1 is a fragmentary perspective view of a first embodiment of kettle tank, with no heater plate.

FIG. 2 is a view of the tank from FIG. 1 in longitudinal section, the heater plate being mounted in the tank.

FIG. 3 is a view analogous to FIG. 2 of a second embodiment of the tank.

FIG. 4 is a view analogous to FIG. 3 of a modified second embodiment of the tank.

DETAILED DESCRIPTION OF THE PREFERRED EMBODIMENTS

A first embodiment will be described first with reference to FIGS. 1 and 2.

An electric kettle includes a plastics material tank side wall structure 1 for liquid to be heated, usually closed at the top by a lid (not shown).

Heating means 2 include at least one electrical element 3 associated with a metal heater plate 4 mounted near the bottom of the tank side wall structure 1.

A heat diffuser plate 5 and a thermal limiter 6 are associated with the heater plate 4 in a manner that is known in itself. For more details on the operation of these heating means reference may be had to French patent application FR 93 09 467.

The side walls 7 of the tank 1 include shoulder means 8 adapted to support a peripheral rim 4c, 4d of the metal heater plate 4.

As shown clearly in FIG. 1, the shoulder means comprise a series of projecting abutments 8 on the inside face of the side wall 7 of the tank, uniformly spaced around the perimeter in a transverse plane of the tank side wall structure 1 and near the bottom of the tank side wall structure.

The peripheral rim of the plate 4 includes a flange 4c parallel to the side walls 7 of the tank 1 and the end of which rests on the abutment 8.

This flange 4c is joined to the plate 4 by a second flange 4b parallel to the flange 4c so that the plate 4 is substantially the shape of a container the bottom of which is formed by the top surface 4a and the edges of which have an inverted U-shape cross-section consisting of the two parallel flanges 4b, 4c and a connecting portion 4d forming the base of the U.

The kettle has a base 11 including a skirt 12 adapted to fit around the tank side walls 7 to compress and reinforce the latter around the heater plate 4.

The base skirt 12 extends from the bottom 11 to a point beyond the shoulders 8 provided on the side walls 7.

The side walls 7 are preferably stepped in the bottom part of the tank side wall structure 1 so that the skirt 12 fits around the side wall 7 in this bottom part aligned with the side wall 7 of the remainder of the kettle.

Fixing means 13, 14 are provided for attaching base 11 to the side wall structure 1.

The fixing means are preferably reversible so that the base 11 can be removed to access and withdraw the heater plate 4 for repair.

In this example, the fixing means comprise a series of projecting hooks 13 on the skirt 12 of the base 11 adapted to be inserted into a series of respective openings 14 in the side walls 7 of the tank side wall structure 1.

The openings 14 are near the bottom end of the side walls, under the abutment 8 forming shoulders.

The hooks 13 and the complementary openings 14 are uniformly spaced in a transverse plane of the tank 1.

It is therefore a very simple matter to fit the heater plate 4 by "clipping" the base 11 around the side walls 7 of the tank 1.

A seal 10 such as a bead of polymerizable silicone or a part injection molded or cut from silicone or some other material is disposed between the side walls 7 and the connecting portion 4d of the peripheral rim of the plate 4.

The side wall 7 include a flange 17 extending towards the interior of the tank side wall structure 1, at the same level as the edge 4c, 4d of the heater plate 4, the seal 10 being compressed between the flange 17 and the edge 4c, 4d of the plate 4.

The flange 17 is parallel to the connecting portion 4d of the edge of the heater plate 4, the seal 10 being interposed between them.

In this example, to hold the seal 10 in place the connecting portion 4d includes a shoulder, the seal 10 being surrounded by the flange 17, the side wall 7 and this shoulder on the connecting portion 4d.

As an alternative to this, as shown in FIG. 4, the flange 17 can terminate at an upstanding edge 17a, the seal 10 being housed in a groove formed by the side wall 7, the flange 17 and the upstanding edge 17a, projecting below the connecting portion 4d of the edge of the plate 4.

This groove facilitates fitting the seal 10 and holding it in place, even if the heater plate 4 is removed.

The method of mounting the plate 4 in the embodiments of FIGS. 3 and 4 constitutes a second embodiment of the invention.

The shoulder means include a peripheral ring 9 of heat resistant material supporting the peripheral rim 4d of the heater plate 4.

This peripheral ring 9 has an inverted L-shaped cross-section with one arm parallel to the side walls 7 of the tank and resting on the abutment 8 and the other arm supporting the connecting portion 4d of the edge of the heater plate 4.

The flange 4c of the edge of the plate 4 is therefore replaced by the peripheral ring 9, with the result that the heater plate 4 is no longer in direct contact with side wall structure 1. The latter can be made from a plastics material of limited heat resistance, such as polypropylene, and therefore of lower cost.

Only the ring 9 needs to be able to withstand high temperatures.

In this second embodiment, the kettle further includes an overlap portion 20 attached to side wall structure 1 and extending generally parallel to the side walls 7, the skirt 12 of the base 11 being accommodated between the side walls 7 and the overlap portion 20.

The fixing means include screws 15, the overlap portion 20 including screwthreaded holes 21 adapted to receive the fixing screws 15.

The screws 15 are inserted into an opening in a fixing lug 22 attached to the base 11 and screwed into the hole 21 which is parallel to the skirt 12 and the side walls 7.

The skirt 12 is therefore nested between the side walls 7 and the overlap portion 20 attached to the tank side wall structure 1, which further reinforces the firm attachment of the plate 4 into the side wall structure by a counter-locking effect.

Of course, the invention is not limited to the examples described hereinabove and many modifications may be made to the latter without departing from the scope of the invention.

Accordingly, the various features relating to the shoulder means, to the fixing of the seal, to the fixing means, etc can be combined in embodiments different from those shown in the figures.

There is claimed:

1. An electric kettle for heating liquid, comprising:

a tank side wall structure formed of plastic material;

a heater plate including an electrical heating element, said heater plate being mounted with a liquid tight joint to an inside peripheral surface of said side wall structure adjacent a lower end thereof and providing a tank floor structure to be directly contacted by liquid to be heated; and a kettle base having a skirt engaged about an outside peripheral surface of said side wall structure adjacent said lower end thereof, and a bottom attached to said skirt;

wherein, said liquid tight joint is provided by shoulder support surfaces on an inside peripheral surface of said side wall structure, a peripheral rim of said heater plate supported on said shoulder support surfaces, and a seal element disposed between said side wall structure and said peripheral rim, the kettle base contributing to maintenance of the liquid tight joint, without axially restraining said heater plate, by providing a peripheral reinforcement of said side wall structure.

2. The kettle claimed in claim 1 wherein said skirt surrounds said side wall structure from said lower end thereof to a point beyond said shoulder support surfaces.

3. The kettle claimed in claim 1 wherein said shoulder support surfaces are provided by a heat resistant material peripheral ring supporting said peripheral rim of said heater plate.

4. The kettle claimed in claim 1 wherein said side wall structure includes a flange extending towards an interior of said sidewall structure at the same level as said peripheral rim of said heater plate, a seal being compressed between said flange and said peripheral rim.

5. The kettle claimed in claim 4 wherein said flange terminates at an upstanding edge, said seal being accommodated in a groove formed by said side wall structure, including said flange and said upstanding edge.

6. The kettle claimed in claim 1 wherein the kettle base skirt is secured to said outside peripheral surface of the wall structure by a series of projecting hooks on said skirt adapted to be inserted into a series of respective openings in said lower end of the side wall structure.

7. The kettle claimed in claim 1 further including a tank overlap portion extending generally parallel to said side wall structure, said skirt of said kettle base being housed between said side wall structure and said overlap portion.

8. The kettle claimed in claim 7 wherein the skirt is secured between said sidewall structure and said overlap portion by screws extending into screwthreaded holes provided in said overlap portion.

9. The kettle claimed in claim 1 wherein said heater plate is a metal heater plate.

* * * * *